(12) United States Patent
Evans et al.

(10) Patent No.: US 12,716,388 B2
(45) Date of Patent: Aug. 25, 2026

(54) CRYOGENIC FUEL SEMI-CLOSED RECIRCULATING BOTTOMING CYCLE

(71) Applicant: RTX CORPORATION, Farmington, CT (US)

(72) Inventors: Brandon M. Evans, San Antonio, TX (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/792,740

(22) Filed: Aug. 2, 2024

(65) Prior Publication Data

US 2026/0036089 A1 Feb. 5, 2026

(51) Int. Cl.

*F02C 7/224* (2006.01)
*B64D 37/30* (2006.01)
*F02C 3/22* (2006.01)

(52) U.S. Cl.

CPC .............. *F02C 7/224* (2013.01); *B64D 37/30* (2013.01); *F02C 3/22* (2013.01); *F05D 2260/213* (2013.01)

(58) Field of Classification Search

None

See application file for complete search history.

(56) References Cited

U.S. PATENT DOCUMENTS

2022/0381183 A1 12/2022 Smith
2023/0280032 A1* 9/2023 Clark ...................... F02C 7/224 60/730
2024/0043135 A1 2/2024 Lambert et al.
2024/0133343 A1 4/2024 Palmer et al.
2024/0417099 A1* 12/2024 Maalouf .................. F02C 3/22

FOREIGN PATENT DOCUMENTS

EP 4137686 A1 2/2023
FR 3128738 A1 5/2023
WO 2023072623 A1 5/2023

OTHER PUBLICATIONS

Extended European Search Report for European Application No. 25193592.0 mailed Dec. 4, 2025.

* cited by examiner

*Primary Examiner* — Lorne E Meade
*Assistant Examiner* — Alyson Joan Harrington
(74) *Attorney, Agent, or Firm* — Carlson, Gaskey & Olds, P.C.

(57) ABSTRACT

An aircraft propulsion system includes a cryogenic fuel system and a fuel flow path where a fuel flow is circulated from upstream in a direction downstream to a combustor of the core engine. A first heat exchanger inputs heat into the fuel flow downstream of the first heat exchanger is used to heat the fuel flow from the fuel storage tank and a second heat exchanger inputs thermal energy from a heat source into the fuel flow from the core engine downstream of the first heat exchanger. A turboexpander is configured to generate shaft power from expansion of the fuel flow exhausted downstream from at least one of the first heat exchanger and the second heat exchanger.

9 Claims, 6 Drawing Sheets

LH2
GENERATOR
NOZZLE
TURBINE
BURNER
COMP 1
Q

CRYOGENIC FUEL SEMI-CLOSED RECIRCULATING BOTTOMING CYCLE

TECHNICAL FIELD

The present disclosure relates generally to a bottom cycle for an aircraft propulsion system utilizing a cryogenic fuel as a working fluid for recovering thermal energy.

BACKGROUND OF THE INVENTION

Gas turbine engines typically include a compressor where inlet air is compressed, mixed with fuel, and ignited to generate a high energy gas flow. The high energy gas flow is expanded through a turbine to generate shaft power. Some energy is recovered as the gas flow expands through the turbine section. However, a significant amount of energy in the form of heat is simply exhausted to atmosphere. A bottoming cycle utilizes heat recovered from the gas flow to heat a working fluid that is used to generate additional useful work. The amount of work generated in a bottoming cycle is limited by the capability of the working fluid to accept heat.

SUMMARY OF THE INVENTION

An aircraft propulsion system according to an exemplary embodiment of this disclosure, among other possible things includes a core engine that includes a combustor where a cryogenic fuel is mixed with compressed air and ignited to generate an exhaust gas flow, a propulsive fan that is driven by shaft power that is generated by the core engine, a cryogenic fuel system that includes a cryogenic fuel storage tank, a fuel flow path where a fuel flow is circulated from upstream in a direction downstream to the combustor of the core engine, a first heat exchanger where heat input into the fuel flow downstream of the first heat exchanger is used to heat the fuel flow from the fuel storage tank, a second heat exchanger where thermal energy from a heat source is input into the fuel flow from the core engine downstream of the first heat exchanger, and a turboexpander that is configured to generate shaft power from expansion of the fuel flow exhausted downstream from at least one of the first heat exchanger and the second heat exchanger.

In a further embodiment of the foregoing aircraft propulsion systems, the turboexpander is configured to receive the fuel flow downstream of the first heat exchanger and upstream of the second heat exchanger.

In a further embodiment of any of the foregoing aircraft propulsion systems, the turboexpander is configured to receive the fuel flow downstream of the second heat exchanger and upstream of the first heat exchanger.

In a further embodiment of any of the foregoing aircraft propulsion systems, the turboexpander is configured to receive the fuel flow downstream from the first heat exchanger.

In a further embodiment of any of the foregoing, the aircraft propulsion system further includes a third heat exchanger where the fuel flow downstream from the first heat exchanger is further heated.

In a further embodiment of any of the foregoing, the aircraft propulsion system further includes a valve system where the fuel flow downstream from the first heat exchanger is split such that a first portion of the fuel flow is communicated to the second heat exchanger and a second portion of the fuel flow is communicated to the third heat exchanger.

In a further embodiment of any of the foregoing, the aircraft propulsion system further includes a bottom compressor where the first portion of the fuel flow is pressurized before communication to the second heat exchanger.

In a further embodiment of any of the foregoing, the aircraft propulsion system further includes a bottom compressor where the fuel flow downstream from the first heat exchanger is pressurized before communication with the valve system.

In a further embodiment of any of the foregoing, the aircraft propulsion system further includes a recuperating heat exchanger for communicating thermal energy between upstream and downstream fuel flow.

In a further embodiment of any of the foregoing aircraft propulsion systems, the heat source includes the exhaust gas flow that is generated from the core engine.

In a further embodiment of any of the foregoing aircraft propulsion systems, the heat source includes a system generating thermal energy that is located outside of a core flow path of the core engine.

A gas turbine engine assembly according to another exemplary embodiment of this disclosure, among other possible things includes a compressor, a combustor and a turbine that is coupled to an engine shaft, a mix of air and fuel is ignited in the combustor to generate an exhaust gas flow that is expanded through the main turbine to drive the engine shaft and subsequently exhausted through an exhaust nozzle, a propulsive fan that is driven by the engine shaft, a cryogenic fuel system that includes a cryogenic fuel storage tank, a fuel flow path where cryogenic fuel flow is circulated from upstream in a direction downstream to the combustor, a first heat exchanger where heat input into the cryogenic fuel flow downstream of the first heat exchanger is used to heat the cryogenic fuel flow from the cryogenic fuel storage tank, a second heat exchanger where thermal energy from a heat source is input into the cryogenic fuel flow downstream from the first heat exchanger, a bottoming cycle system that includes a bottoming compressor configured to pressurize at least a portion of the cryogenic fuel flow exhausted from the first heat exchanger and a turboexpander configured to generate shaft power from expansion of the cryogenic fuel flow exhausted from at least one of the first heat exchanger and the second heat exchanger.

In a further embodiment of the foregoing, the gas turbine engine assembly further includes a valve system where the cryogenic fuel flow exhausted from the first heat exchanger is split such that a first portion of the fuel flow is communicated to the bottoming compressor and a second portion of the fuel flow is communicated to the combustor.

In a further embodiment of any of the foregoing gas turbine engine assemblies, the valve system is further configured to adjust a flow rate of the second portion of the fuel flow independent of the first portion of the fuel flow.

In a further embodiment of any of the foregoing gas turbine engine assemblies, the bottoming compressor is configured to pressurize the cryogenic fuel flow before communication to the valve system.

In a further embodiment of any of the foregoing, the gas turbine engine assembly further includes a recuperating heat exchanger for communicating thermal energy between upstream and downstream fuel flow.

In a further embodiment of any of the foregoing gas turbine engine assemblies, the heat source includes at least one of the exhaust gas flow generated from the combustor and a system generating thermal energy that is located outside of a core flow path.

A method of assembling an aircraft propulsion system according to another exemplary embodiment of this disclosure, among other possible things includes assembling a core engine that includes a combustor where a cryogenic fuel is mixed with compressed air and ignited to generate an exhaust gas flow, assembling a propulsive fan that is configured to be driven by shaft power generated by the core engine, assembling a cryogenic fuel system that includes a cryogenic fuel storage tank and a fuel flow path where a fuel flow is circulated from upstream in a downstream direction to the combustor of the core engine, assembling a first heat exchanger where heat input into the fuel flow downstream of the heat exchanger is input into the fuel flow is used to heat the fuel flow from the cryogenic fuel storage tank, assembling a second heat exchanger where thermal energy from a heat source is input into the fuel flow from the core engine downstream of the first heat exchanger, and assembling a bottoming cycle system that includes a bottoming compressor configured to pressurize the fuel flow exhausted from the first heat exchanger and a turboexpander configured to generate shaft power from expansion of the fuel flow exhausted from at least one of the first heat exchanger and the second heat exchanger.

In a further embodiment of the foregoing, the method further includes assembling a valve system configured to split the fuel flow exhausted from the first heat exchanger into a first portion of the fuel flow that is communicated to the bottoming compressor and a second portion of the fuel flow that is communicated to the combustor and configuring the valve system to be controlled to adjust a flow rate of the second portion of the fuel flow independent of the first portion of the fuel flow.

In a further embodiment of any of the foregoing, the method further includes assembling the turboexpander to drive at least one of a generator, fuel pump or accessory device.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
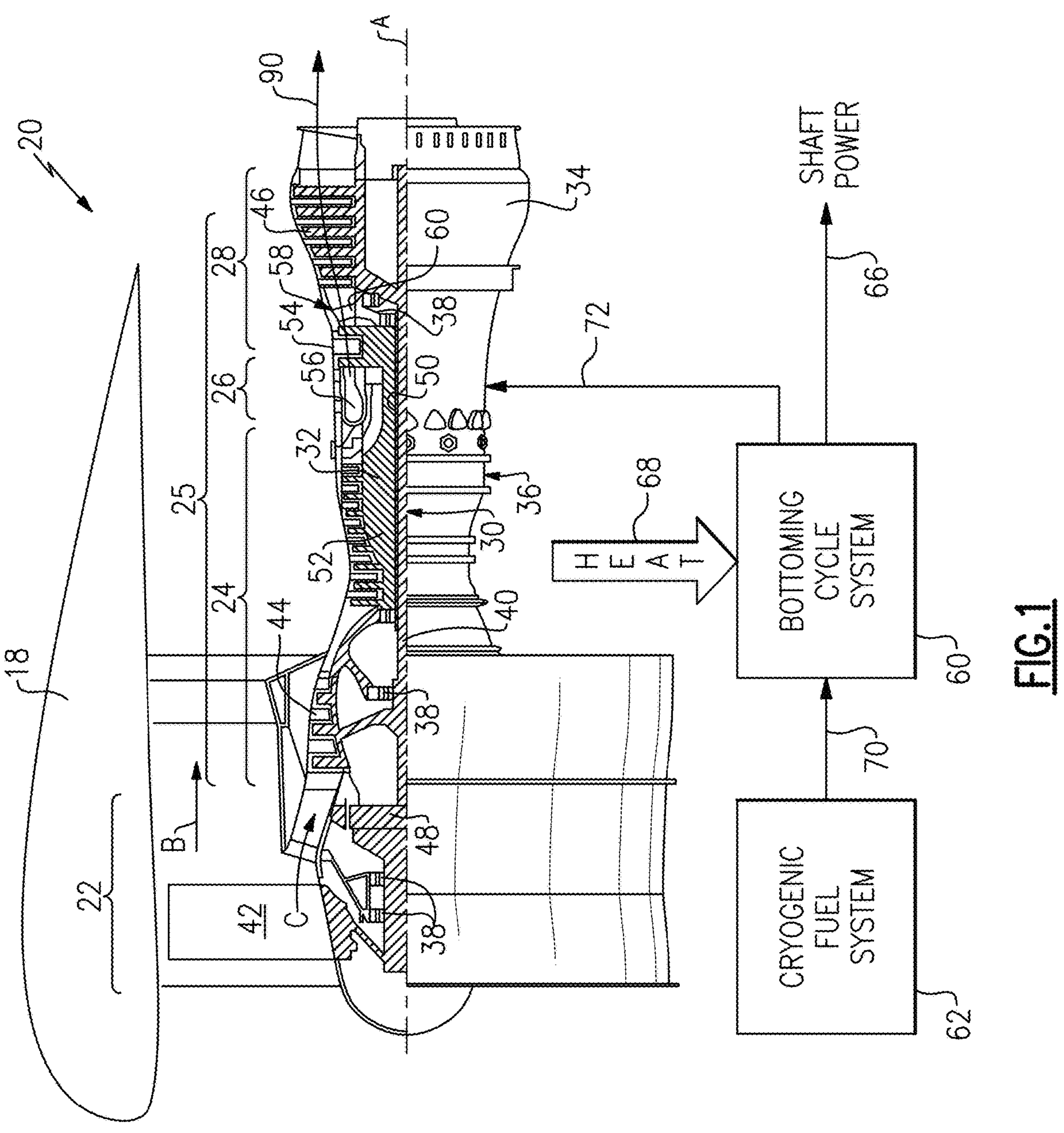
FIG. 1 is a schematic view of an example aircraft propulsion system including a cryogenic fuel system and bottom cycle system.

FIG. 1 schematically shows an aircraft propulsion system 20 that includes a cryogenic fuel system 62 and a bottoming cycle system 60. The bottoming cycle system 60 uses a cryogenic fuel as a working fluid to both heat liquid fuel prior to introduction into a core engine 25 and to generate power from recovered thermal energy.

The bottoming cycle system 60 generates shaft power 66 from thermal energy 68 that is input into a flow of cryogenic fuel 70. The heat input into the cryogenic fuel is also used to generate power and to produce a vaporized fuel flow 72 for injection into a combustor 56. The liquid cryogenic fuel 70 is sufficiently cool that care is required to prevent freezing of other fluids that come into thermal contact, including fluids that may be used to heat and vaporize the fuel. The disclosed system uses a heated gaseous fuel to heat the liquid fuel and thereby avoid problematic interactions with other fluids.

The example propulsion system 20 is disclosed as a two-spool turbofan that generally incorporates a fan section 22 and a core engine 25 that generates an exhaust gas flow for driving the fan section 22. The core engine 25 includes a compressor section 24, a combustor section 26, and a turbine section 28. The fan section 22 may include a single-stage fan having a plurality of fan blades 42. The fan blades 42 may have a fixed stagger angle or may have a variable pitch to direct incoming airflow from an engine inlet. The fan 22 drives air along a bypass flow path B defined within a nacelle 18, and also drives air along a core flow path C for compression and communication into the combustor section 26 then expansion through the turbine section 28. Exhaust gas flow is finally exhausted through a nozzle 34.

The exemplary core engine 25 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner engine shaft 40 that interconnects, a first (or low) pressure compressor 44 and a first (or low) pressure turbine 46. The inner engine shaft 40 is connected to the fan section 22 through a speed change mechanism, which in one example is illustrated as a geared architecture 48 to drive the fan section 22 at a lower speed than the low speed spool 30. The inner engine shaft 40 may interconnect the low pressure compressor 44 and low pressure turbine 46 such that the low pressure compressor 44 and low pressure turbine 46 are rotatable at a common speed and in a common direction. Although this application discloses geared architecture 48, its teaching may benefit direct drive engines having no geared architecture.

The high speed spool 32 includes an outer engine shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner engine shaft 40 and the outer engine shaft 50 are concentric and rotate via bearing systems 38 about the engine central longitudinal axis A which is collinear with their longitudinal axes.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

Figure 2:
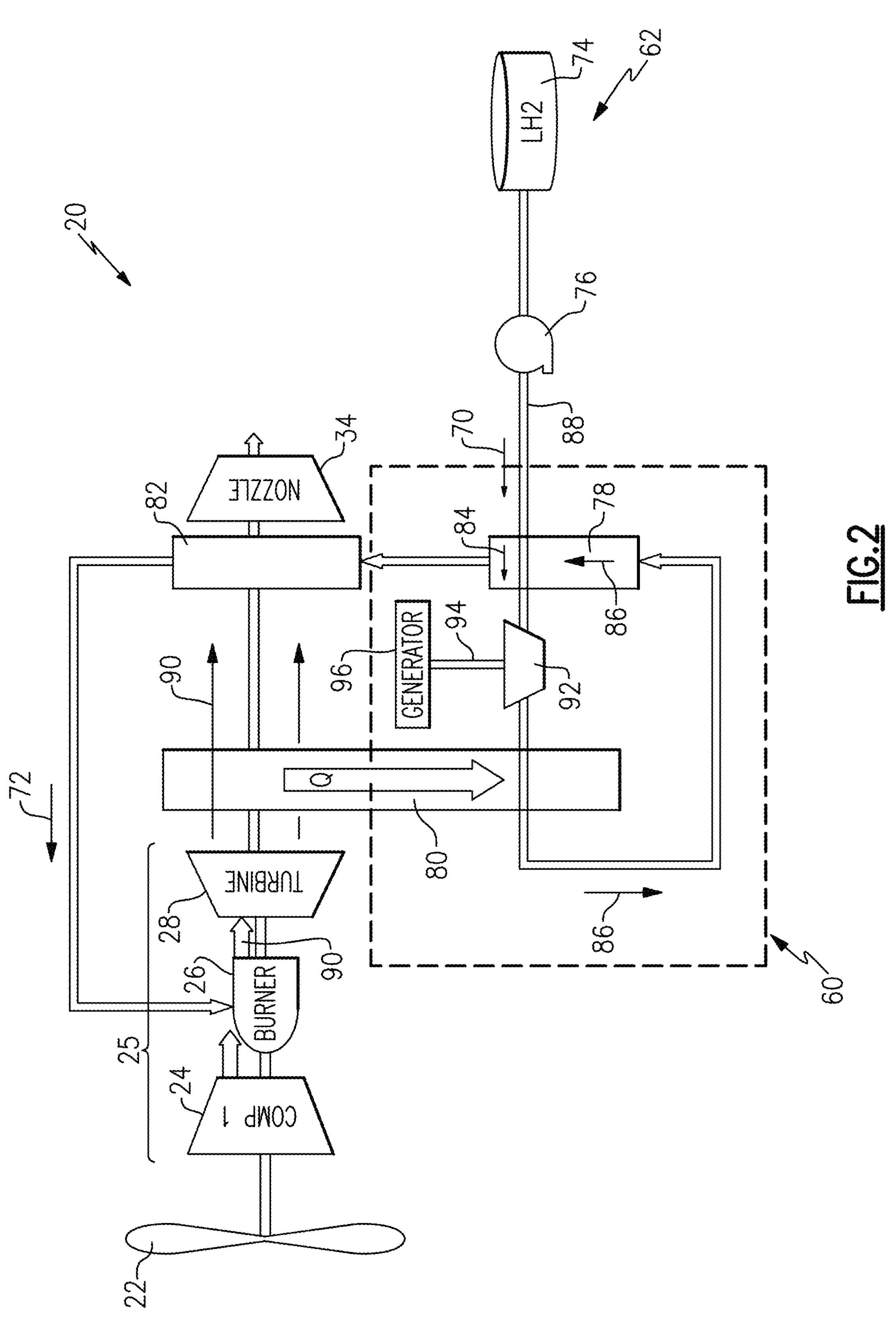
FIG. 2 is a simplified schematic view of an example aircraft propulsion system including a cryogenic fuel system and bottom cycle system.

Referring to FIG. 2 with continued reference to FIG. 1, a simplified schematic view of the propulsion system 20 is shown. The cryogenic fuel system 62 includes at least a fuel tank 74 and a fuel pump 76 to provide a fuel flow 70 to the combustor 26 through a fuel flow path 88. The fuel flow path 88 defines a path for circulation of a cryogenic fuel flow from an upstream location beginning at the fuel tank 74 in a downstream direction toward the combustor 26. The example fuel system 62 is configured to provide a hydrogen based fuel such as a liquid hydrogen ($LH_2$). Although hydrogen is disclosed by way of example, other cryogenic, non-carbon based fuels could be utilized and are within the contemplation of this disclosure.

The fuel tank 74 includes features for storing a cryogenic fuel at temperatures required to maintain the fuel in a liquid phase. Temperatures required to maintain the cryogenic fuel in a liquid phase may be as low as about −412° F. In one example embodiment, the cryogenic fuel is maintained at a temperature below 0° F. In another example embodiment, the fuel is maintained in the tank 74 at temperatures below −100° F. The cryogenic fuel may be maintained at temperatures below about −150° F. and as low as about −435° F.

The fuel system 62 communicates a liquid fuel to the bottoming cycle system 60. The bottoming cycle system 60 includes a first heat exchanger, a second heat exchanger 80 and a turboexpander 92. The first heat exchanger 78 places a flow of liquid fuel 70 into communication with a heated downstream fuel flow 86. An upstream cooler fuel flow 84 from the fuel tank 74 is heated in the first heat exchanger by the downstream fuel flow 86. The upstream fuel flow 84 exhausted from the first heat exchanger 78 is in a substantially gaseous form. Energy from the fuel flow 84 is recovered by expanding the now hot gaseous fuel flow 84 through the turboexpander 92.

The turboexpander 92 drives a shaft 94 coupled to drive a generator 96. The generator 96 produces electric energy that can be used to power devices of the propulsion system 20. Moreover, although a generator 96 is shown and described as an example, other devices such as pumps, fans, gearboxes, or any other accessory component may be driven by the shaft power generated by the turboexpander 92. Moreover, the shaft 94 may be selectively coupled to one of the engine shafts 40, 50, to supplement power generated in the turbine section 28.

The second heat exchanger 80 is in thermal communication with a heat source 68. In one example embodiment, the heat source 68 is the exhaust gas flow 90 exhausted from the turbine section 28. Heat from the exhaust gas flow 90 heats the fuel in the second heat exchanger 80 to further heat the gaseous fuel flow exhausted from the turboexpander 92. The heated fuel flow 86 is routed through the first heat exchanger 78 to transfer heat to the upstream fuel flow 84 prior to entering the turboexpander 92.

The heated fuel flow 86 exhausted from the first heat exchanger 78 is heated again in a third heat exchanger 82. The third heat exchanger 82 communicates thermal energy from the exhaust gas flow 90 into the fuel flow 86 to completely vaporize all of the fuel and generate the gaseous fuel flow 72 that is injected into the combustor 26. The example bottoming system 60 provides both for heating of the liquid cryogenic fuel 70 into a gaseous form and recapture of thermal energy with the turboexpander 92.

Figure 3:
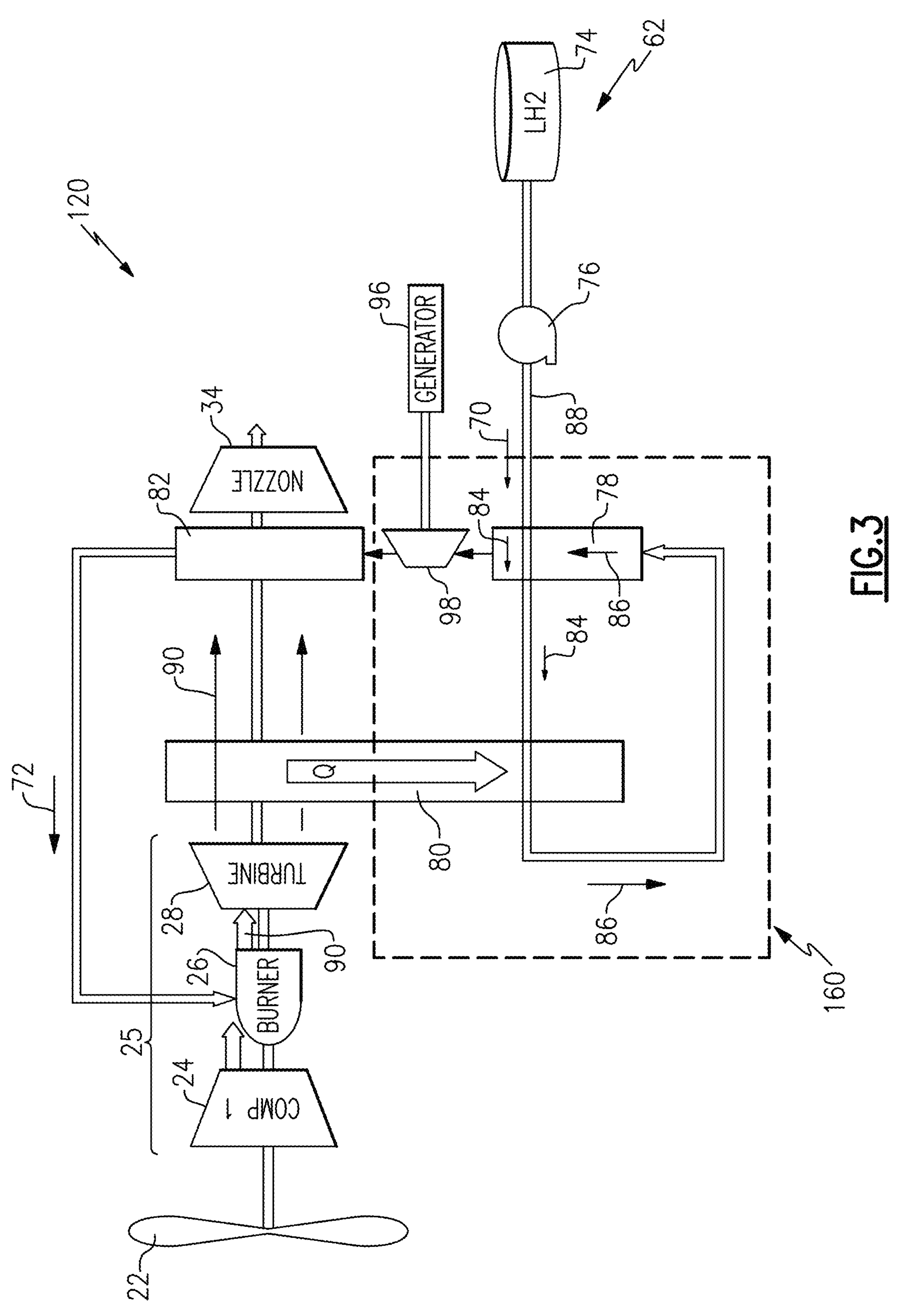
FIG. 3 is a simplified schematic view of another example aircraft propulsion system including a cryogenic fuel system and bottom cycle system.

Referring to FIG. 3, another example propulsion system 120 includes the fuel system 62 and a bottoming cycle system 160. The example bottoming cycle system 160 includes a turboexpander 98 that is disposed downstream of the first heat exchanger 78 and upstream from the third heat exchanger 82. Location of the turboexpander 98 after or downstream of the first heat exchanger 78 provides for recovery of thermal energy input from the exhaust gas flow 90 within the second heat exchanger 80 that is not used to heat the fuel flow 84. The remaining thermal energy in the fuel flow 86 after heating the upstream fuel flow 84 is recaptured by expansion through the turboexpander 98. The gaseous fuel flow exhausted from the turboexpander 98 is then further heated and vaporized to provide the gaseous flow 72 for communication into the combustor 26.

Figure 4:
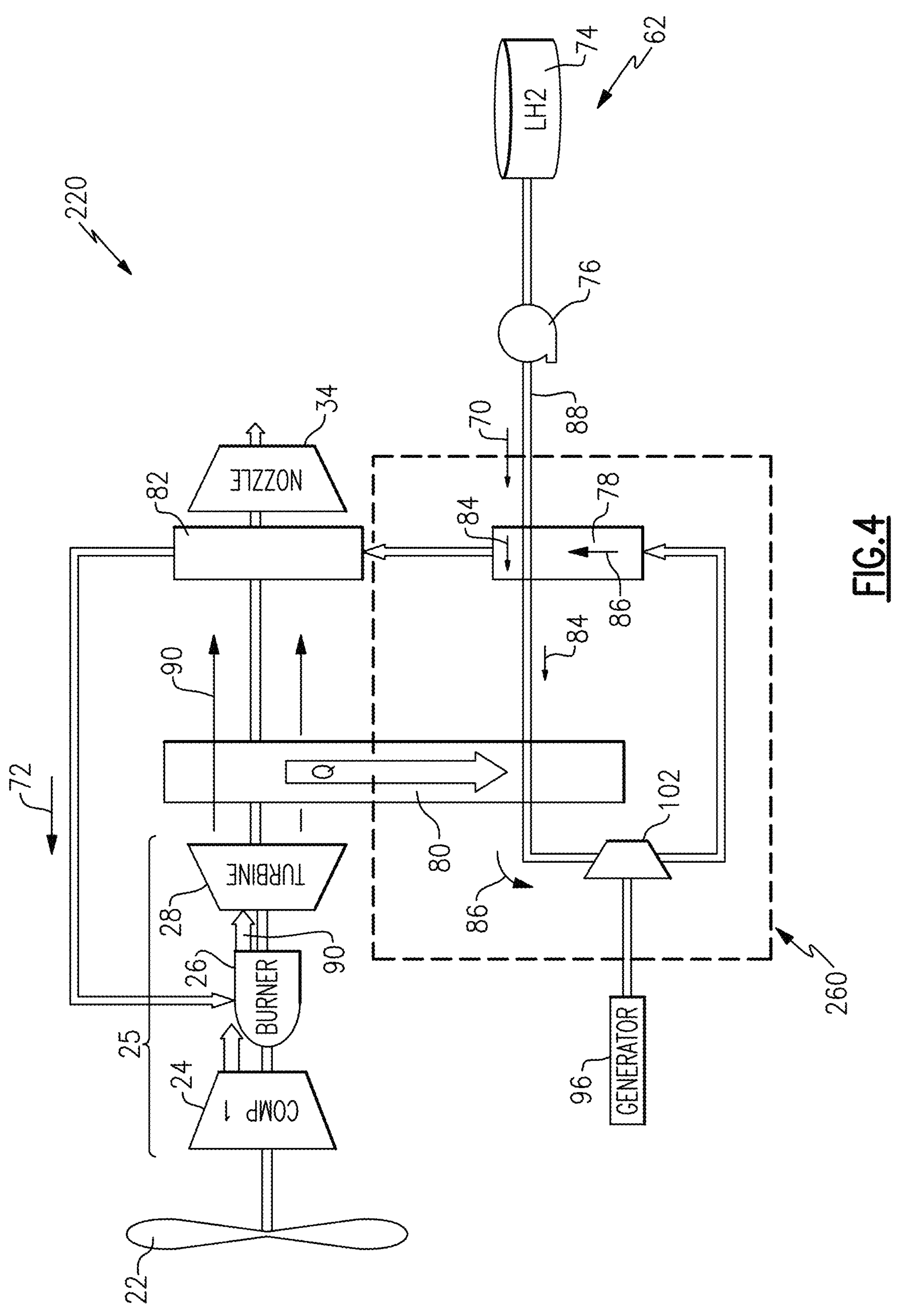
FIG. 4 is a simplified schematic view of yet another example aircraft propulsion system including a cryogenic fuel system and bottom cycle system.

Referring to FIG. 4, another example propulsion system 220 includes the fuel system 62 and the bottoming cycle system 260. The example bottoming cycle system 260 locates a turboexpander 102 after the second heat exchanger 80 and before the first heat exchanger 78 in the fuel flow path 88. Thermal energy input into the fuel flow 86 is recaptured by expansion through the turboexpander 102 before communication with the upstream fuel flow 84 in the first heat exchanger 78. Thermal energy within the fuel flow 86 is sufficient to drive the turboexpander 102 and heat the liquid fuel flow 70. Location of the turboexpander 102 after the second heat exchanger 80 prioritizes generation of shaft power to drive the generator 96 over the initial heating of the liquid fuel flow 70. While a generator is described by way of example another component and/or accessory device may use the generated shaft power.

Figure 5:
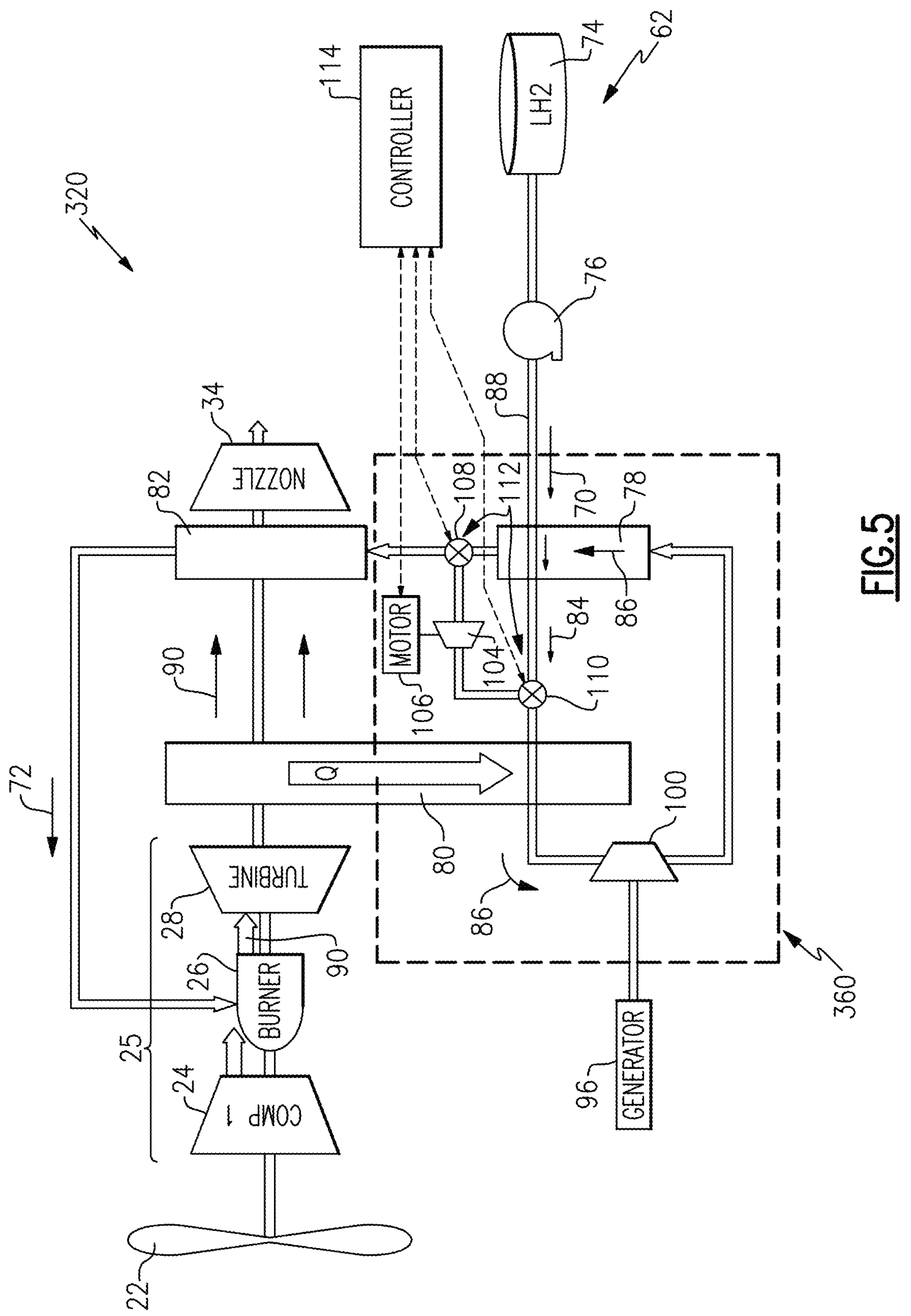
FIG. 5 is a simplified schematic view of yet another example aircraft propulsion system including a cryogenic fuel system and bottom cycle system.

Referring to FIG. 5, another example propulsion system is schematically indicated at 320 and includes a bottoming cycle 360 with a bottoming compressor 104. The bottoming compressor 104 is shown coupled to an electric motor 106 and pressurizes a fuel flow for recirculation of a portion of fuel flow back through the second heat exchanger 80. A valve system 112 and a controller 114 are operated to vary fuel flow recirculated back into the bottoming cycle system 360.

The example controller 114 is a device and system for performing necessary computing or calculation operations of the valve system 112 and the electric motor 106 to operate the bottoming compressor 104. The controller 114 may be specially constructed for operation of the valve system 112 and bottoming compressor 104, or it may comprise at least a general-purpose computer selectively activated or reconfigured by software instructions stored in the memory device 38. The controller 114 may further be part of full authority digital engine control (FADEC) or an electronic engine controller (EEC). The example controller 114 is programmed to operate the valve system 112 and the bottoming compressor 104 to vary a fuel flow rate to the combustor 26 independent of a fuel flow rate to the bottoming compressor 104.

The example valve system 112 includes a first valve 108 and a second valve 110 are operated by the controller 114. Fuel flow through the third heat exchanger 82 and fuel flow recirculated back through the first and second heat exchangers 78, 80 is independently controlled to assure that sufficient fuel is provided to the core engine 25 to support power requirements. The fuel flow communicated back into the bottoming cycle system 360 is pressurized in the bottoming compressor 104 and passed through the second valve 110 for reheating in the second heat exchanger 80. The pressurized and heated fuel flow 86 may then be expanded through the turboexpander 100 to generate shaft power to drive the generator. The expanded fuel flow exhausted from the turboexpander 100 is routed through the first heat exchanger 78 to heat the liquid fuel flow 70 and proceed back to the first valve 108. At the first valve 108, the fuel flow is divided into separate and independently varied fuel flows to the core engine 25 and back to the bottoming cycle system 360.

Figure 6:
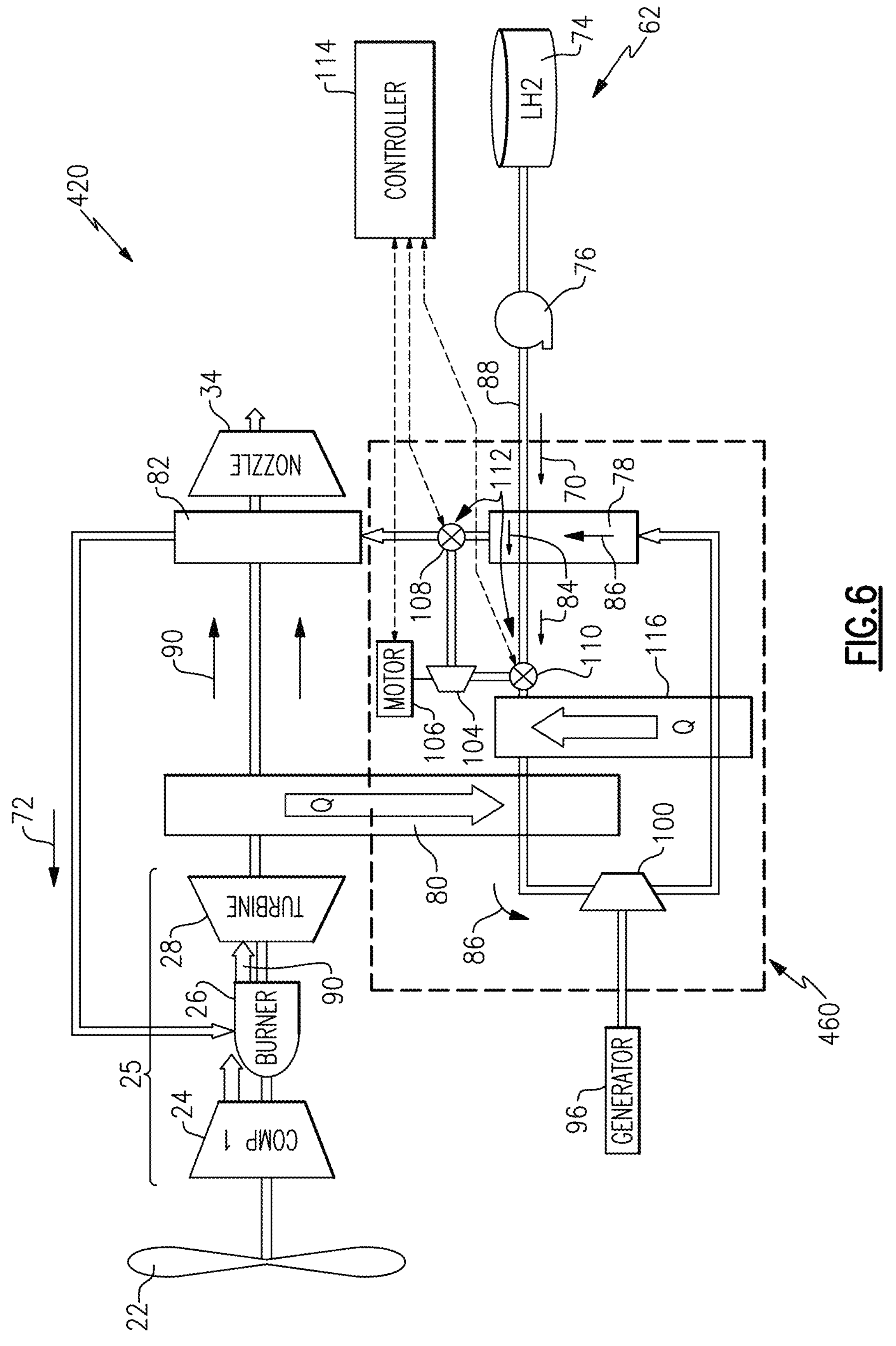
FIG. 6 is a simplified schematic view of still another example aircraft propulsion system including a cryogenic fuel system and bottom cycle system.

Referring to FIG. 6, another example propulsion system is schematically indicated at 420 and includes a bottoming cycle system 460 with a recuperating heat exchanger 116. The example bottoming cycle system 460 includes the bottoming compressor 104 and valve system 112 for splitting fuel flows between the core engine 25 and the bottoming cycle system 460. The recuperating heat exchanger 116 provides for the further communication of thermal energy between the upstream fuel flow 84 and the downstream fuel flow 86 within the first heat exchanger 78. The downstream fuel flow 86 is exhausted from the turboexpander 100 before communication to the first heat exchanger 78. The additional transfer of thermal energy into the upstream fuel flow 84 may increase operating efficiencies by increasing power generation capability of the turboexpander 100.

The example recuperating heat exchanger 116 is disclosed as transferring thermal energy at a location after the second valve 110 where recirculating fuel flow is introduced into the fuel flow path 88. The recuperating heat exchanger 116 maybe arranged to transfer thermal energy between different locations in the fuel flow path 88 within the bottoming cycle system 460 to maximize recovery of thermal energy. Such other locations and configurations of the recuperating heat exchanger are within the scope and contemplation of this disclosure.

Accordingly, the disclosed example cryogenic fuel system and bottoming cycle systems improve engine operating efficiencies by using cryogenic fuel as both a working fluid to recover thermal energy and as a heat source to vaporize liquid fuel prior to introduction into a core engine 25.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An aircraft propulsion system comprising:

a core engine comprising a combustor where a cryogenic fuel is mixed with compressed air and ignited to generate an exhaust gas flow;

a propulsive fan driven by shaft power generated by the core engine;

a cryogenic fuel system comprising a cryogenic fuel storage tank;

a fuel flow path where a fuel flow is circulated from upstream at the cryogenic fuel storage tank in a direction downstream to the combustor of the core engine;

a first heat exchanger where heat input into the fuel flow downstream of the first heat exchanger is used to heat the fuel flow from the cryogenic fuel storage tank;

a second heat exchanger where thermal energy from a heat source from the core engine is the heat input into the fuel flow downstream of the first heat exchanger, wherein the heated fuel flow from the second heat exchanger flows into the first heat exchanger to heat the fuel flow from the cryogenic fuel storage tank; and a turboexpander configured to generate shaft power from expansion of the fuel flow exhausted downstream from the first heat exchanger, wherein the turboexpander is configured to receive the fuel flow downstream of the first heat exchanger and upstream of the second heat exchanger.

2. The aircraft propulsion system as recited in claim 1, further comprising a third heat exchanger where the fuel flow downstream from the first heat exchanger is further heated.

3. The aircraft propulsion system as recited in claim 1, the first heat exchanger is a recuperating heat exchanger for communicating thermal energy between upstream and downstream fuel flow.

4. The aircraft propulsion system as recited in claim 1, wherein the heat source comprises the exhaust gas flow generated from the core engine.

5. The aircraft propulsion system as recited in claim 1, wherein the turboexpander is coupled to drive a generator.

6. The aircraft propulsion system as recited in claim 1, further comprising a fuel pump that provides the fuel flow from the cryogenic fuel storage tank to the first heat exchanger, wherein the fuel flow generated by the fuel pump is directed to the first heat exchanger prior to being directed to any other source of thermal energy.

7. The aircraft propulsion system as recited in claim 6, wherein the fuel flow from the fuel pump is in a liquid phase when communicated to the first heat exchanger and is exhausted in a gaseous phase for communication to the turboexpander.

8. The aircraft propulsion system as recited in claim 1, wherein the heat input into the fuel flow within the second heat exchanger comprises heat from the exhaust gas flow from the core engine and a third heat exchanger is configured to transfer additional thermal energy from the exhaust gas flow into the fuel flow exhausted from the first heat exchanger.

9. The aircraft propulsion system as recited in claim 8, wherein the third heat exchanger receives the exhaust gas flow downstream from the second heat exchanger.

* * * * *